Oct. 20, 1936.　　　R. C. FOLGER　　　2,058,145
PROCESS OF RECOVERING ALUMINA FROM ALUMINOUS MATERIALS
Filed June 27, 1934
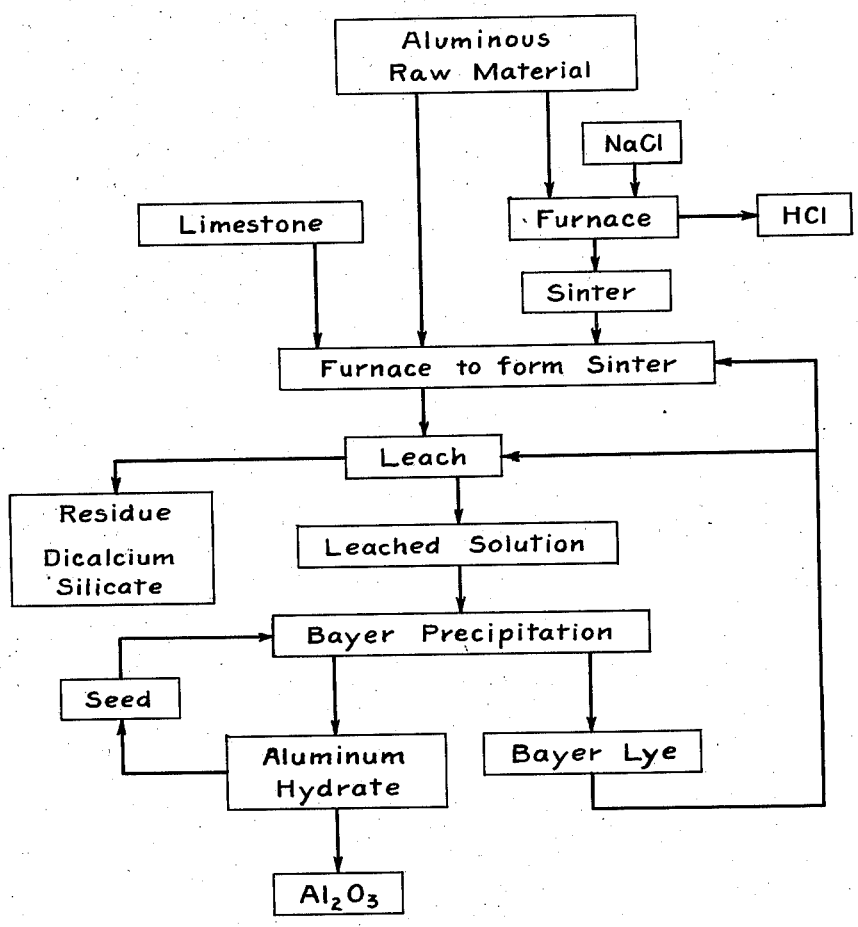
INVENTOR
Roy C. Folger
BY
Evans & McCoy
ATTORNEYS Patented Oct. 20, 1936

2,058,145

UNITED STATES PATENT OFFICE 2,058,145

PROCESS OF RECOVERING ALUMINA FROM ALUMINOUS MATERIALS

Roy C. Folger, Dearborn, Mich., assignor to The Electric Smelting and Aluminum Co., Cleveland, Ohio, a corporation of Ohio Application June 27, 1934, Serial No. 732,569

10 Claims. (Cl. 23—142)

This invention relates to the recovery of alumina from aluminous silicious materials, such as clay, silicious bauxite, residue from burning coal, blast furnace slag, feldspar and other suitable aluminous materials, and particularly relates to the improvements in the process of extracting alumina from such aluminous silicious materials.

An object of this invention is to provide a practical and economical process for the extraction of alumina from aluminous silicious materials, using cheap and readily available raw materials.

A further object of the process is to provide one that will yield a minimum of by-products that will have to be disposed of in addition to the recovered alumina, and also a process in which the by-products formed are of such nature that they are or may be readily converted into commercial by-products.

Another object of this invention is to provide a sodium compound from an inexpensive source for addition to the main furnace charge to replace losses of sodium in the process and to add such sodium compound in a relatively inexpensive and advantageous manner.

A further object of the present invention is to carry on the process according to an efficient standardized method, by controlling the composition of the charge in order that the furnacing operation can be standardized and controlled to form sinters of uniform composition which may be readily treated in a uniform manner to recover sodium aluminate and dicalcium silicate.

Another object of the invention is to continuously reuse the residual depleted sodium aluminate resulting from the process by adding the desired portion to the furnace charge for forming sodium aluminate and dicalcium silicate, thus adding sodium and alumina to the aluminous silicious material for enriching and standardizing the material to be furnaced, and by using a portion, if desired, in connection with the dissolving or leaching of the aluminous content from the sinter.

It has been proposed to extract alumina from aluminous silicious materials by preparing a furnace charge mixture of such material, together with limestone and sodium carbonate, and subject it to a furnacing operation to produce a sinter, which, when leached with water or a weak alkali solution, dissolves the sodium aluminate, leaving insoluble dicalcium silicate. Alumina is recovered from the sodium aluminate thus obtained in any well known manner, one of the most usual methods being to submit the sodium aluminate to the Bayer precipitation process, whereby a large portion of the alumina is precipitated as aluminum hydrate, from which alumina may be readily obtained.

In the application of Alfred W. Scheidt and myself, Serial No. 555,268, filed August 5, 1931, now Pat. No. 1,971,354, a process of recovering alumina from aluminous silicious material has been disclosed in which residual depleted sodium aluminate, low in alumina, resulting from the Bayer precipitation process is added to the aluminous silicious material in preparing the furnace charge to provide sodium compound for the process. By the process disclosed in said application the aluminous content of the furnace charge is also increased to the extent that alumina is present in the residual "spent lye" from the Bayer precipitation process.

It is sometimes desired, however, to use a portion of the spent lye from the Bayer precipitation process in connection with the dissolving or leaching of the aluminous silicious material from the sintered or furnace product, and even if a portion of the spent lye from the Bayer process is added to the main furnace charge to furnish some of the necessary sodium oxide to carry out the process, it is also necessary to add sodium oxide to the charge in some form to obtain a standard furnace charge.

A flow sheet of the process is shown in the accompanying drawing.

In practicing this invention a preliminary furnace charge is made from a small amount of the aluminous material, such as clay, coal ash, feldspar, blast furnace slag and other suitable aluminous material, and is mixed with a calculated amount of sodium chloride, the mixture being in fine physical condition, either by grinding the ingredients before, during, or after mixing. The amount of aluminous material for the preliminary furnacing operation about to be described is a relatively small percent of the amount of aluminous material that is to be used to form a standard furnace charge with limestone and a sodium compound. The amount of sodium chloride added to this small preliminary charge of aluminous material is a calculated amount so that the sodium content calculated as sodium oxide will be present in molecular ratio varying from 1:1 to 2:1 in relation to the aluminum oxide. Preferably the amount of sodium oxide is above 1.5:1 or as high as 2:1 in order to reduce the amount of aluminous material needed in preparing the charge and lessen the burden of the preliminary furnacing operation. The choice of the molecular ratio of sodium oxide to aluminum oxide in the furnace charge varies somewhat according to the conditions, depending upon the composition of the aluminous raw material used, the furnace temperatures, and other factors, and, therefore, some range has to be permitted in the choice of molecular ratio in the preliminary charge.

This prepared charge is then heated in a suitable furnace through which a current of steam is flowing, and in which an oxidizing atmosphere is maintained, to form a sinter. The temperature of sintering depends on the material treated, but usually runs from about 900° C. to 1200° C. The aluminous raw material and the sodium chloride react in this preliminary furnacing operation to form gaseous hydrochloric acid and a sinter of silico-sodio-aluminate. The gaseous hydrochloric acid which is formed may be condensed and recovered from this process as dilute hydrochloric acid.

The silico-sodio-aluminate resulting from the above sintering operation is then mixed with sufficient of the raw aluminous material from which it is desired to extract alumina, together with a calculated amount of calcium carbonate or other suitable calcium compound or alkali earth metal compound, and the ground mixture is then heated in a rotary kiln or other furnace to form a sinter. In preparing this main furnace charge it is preferable to use a molecular ratio of 2 molecules of calcium oxide to 1 molecule of silica and 1 to 1.7 molecules of alkali metal oxide to 1 molecule of aluminum oxide. Usually the ratio of alkali metal oxide to aluminum oxide would be from about 1.2 to 1 to about 1.5 to 1.

In order to prepare a standard furnace charge for the main furnacing operation it is sometimes desirable to add a compound consisting predominantly of alumina. This is particularly desirable when the aluminous material from which it is desired to extract the alumina is an aluminous silicious material not containing a sufficient percentage of alumina to give the proper molecular proportion of alumina to provide a mixture which may be easily and efficiently furnaced. In such a standard charge mixture having a substantially uniform content of alumina, alkali, lime and silica, furnacing of the charge and treating of the resulting sinter may be standardized, and thus the process may be operated on a large scale with a minimum of difficulties, and a maximum of economies result from such standardized practice.

The charge is heated to a suitable temperature for sintering the material which may be from 1100° C. to 1400° C. in a suitable furnace, such as a rotary furnace. The operations of preparing the charge and furnacing are preferably similar to that used in the wet process of making Portland cement. While calcium carbonate is usually the preferred form in which to add the alkali earth metal oxide to the furnace charge, other calcium compounds or other alkali earth metal compounds may be utilized. If, in the specific raw materials used in making the furnace charge, a magnesium compound or compounds occur, such compounds should be included in the computation in preparing the standard furnace charge on a chemically equivalent basis to the calcium compound.

The sinter thus produced from the main or second furnacing operation is then preferably ground preparatory to a leaching or digesting step to dissolve both the alkali metal content and the aluminum content as alkali metal aluminate, leaving an insoluble residue material which consists mainly of dicalcium silicate. The leaching or dissolving of the sodium aluminate from the ground sinter can be accomplished by employing plain water if the sodium oxide to aluminum oxide ratio is sufficiently high to keep the sodium aluminate solution in stable condition. Instead, however, of using plain water, a weak alkali solution may be utilized to dissolve the sodium aluminate from the insoluble residue. For this purpose a very convenient solution to use is the residual spent lye from the Bayer precipitation process, which solution is low in alumina and a portion or all of such spent lye may be used to aid in the dissolving or leaching of the sodium aluminate.

The alkali aluminate solution may, if desired, be subjected to suitable well known purification steps before precipitation of the aluminum hydrate. The sodium aluminate solution is preferably subjected to the well known Bayer process, in which previously precipitated aluminum hydrate is added to the aluminate liquor and the whole agitated, whereby a large portion of the aluminous content separates out as aluminum hydrate.

This Bayer precipitation may be carried out to a point where a major portion of the aluminous content, such, for example, as 75%, is precipitated as aluminum hydrate. The Bayer precipitation process is more efficient when it is not carried out to completion, that is, when the precipitation is carried to a certain point, the subsequent precipitation of the aluminum hydrate is very slow, and the percentage of the impurities precipitated out rapidly increases during the later stages of precipitation of the aluminum hydrate. In the process disclosed herein it is unnecessary to carry out the precipitation in the Bayer process to a point beyond where it is efficient, because the residual liquor or spent lye may all be used over again in the process. In this manner an aluminum hydrate of exceptionally high purity is obtained.

A portion of the spent lye may be reused in the process in connection with the dissolving or leaching of the aluminous material from the second furnacing operation. The spent lye that is not used in connection with the leaching may be evaporated or concentrated, and such recovered sodium compound may be used in connection with the preparation of new furnace charges with new aluminous raw material and limestone and sufficient of the product of the preliminary furnacing operation to form new standard charges to be furnaced.

Instead of evaporating and concentrating the spent lye for immediate use in connection with the making up of standard charges for the main furnacing operation, it may be noted that the spent lye may be treated with carbon dioxide, as is well known, to precipitate out the remaining aluminum hydrate and the resulting sodium carbonate liquor evaporated and concentrated, and such recovered sodium compound may be used in making up standard charges for the main furnacing operation.

It will also be seen that when the desired proportion of the spent lye to be reused for leaching the sodium aluminate from the main furnace product has been established, such percentage of sodium aluminate solution is practically in a constant cycle in the leaching and precipitation steps of the process, and the remainder of the spent lye is, therefore, always available for use in making new furnace charges.

It will also be seen that additional sodium oxide or other alkali metal oxides necessary to form the main furnace charge in the proper proportions may be readily derived from the sinter of the preliminary furnacing operation. The preliminary furnacing operation is essential to convert the sodium chloride into a suitable form for addition to the main furnace charge, as sodium chloride cannot be used effectively as a source of sodium oxide in the main furnacing operation, for the reason that in the presence of substantial amounts of calcium oxide the sodium chloride tends to fuse and be lost without entering into the reaction.

By first sintering a charge of aluminous raw material and sodium chloride to obtain a silico-sodio-aluminate for use in supplying sodium in the main furnace charge in a form in which the reaction between the aluminous silicious material and the calcium carbonate react together, I have provided a process by which sodium chloride may be utilized for supplying the necessary additional sodium content for carrying out the reactions in the main furnacing operation, thereby obviating the addition of more expensive material, such as sodium carbonate or soda ash to replenish losses.

In order to illustrate the advantages of the present invention the following example is given. Taking an aluminous silicious material containing 35% alumina and 42% silica, if it is assumed that the soda losses in the preliminary furnacing operation amount to about 2% of the soda content and in the main furnacing operation and succeeding steps of the process 7½% of the soda content, the furnace charges for treating 500 tons of the aluminous material are given below:

The charge for the main furnacing operation, using the molecular ratios of 1.3 $Na_2O$ to 1 $Al_2O_3$ and 2 $CaO$ to 1 $SiO_2$, would be:

| | Tons |
|---|---|
| Silico-sodio-aluminate | 35.4 |
| Aluminous raw material | 475 |
| $CaCO_3$ | 700 |
| Sodium aluminate of the composition 6 $Na_2O.Al_2O_3$ | 162.8 |

For the preliminary furnacing operation, using a molecular ratio of 2 $Na_2O$ to 1 $Al_2O_3$ it would be necessary to take 25 tons of the aluminous material and 20 tons of sodium chloride, which, when sintered, would yield about 35.4 tons of silico-sodio-aluminate (a loss of about 2% $Na_2O$ being deducted) and about 12.4 tons of gaseous HCl.

In the above example it will be seen that only about 5% of the aluminous raw material for a given furnace charge is subjected to the preliminary furnacing operation. If, however, the percentage of alumina in the aluminous raw material is higher than in the above example or the soda losses in the process are lower than those assumed above, then less of the aluminous raw material is necessary for the preliminary furnacing operation, and this might run as low as 1 or 2%.

Conversely, if the percent of alumina in the aluminous material being treated is lower and the soda losses are higher than those assumed above, more of the aluminous raw material will have to be subjected to the preliminary furnacing operation, and this may run considerably higher than 5%, such as 15% or more.

If the particular aluminous material being treated by this process requires a different molecular proportion of soda to alumina than that assumed in the example given, then it will be necessary to take this into consideration in computing the amount of aluminous material to be treated in the preliminary furnacing operation.

In any event, however, it will be seen that the proportion of aluminous raw material to be subjected to the preliminary furnacing operation is a relatively small percentage of that required for a standard charge in the main furnacing operation.

It will thus be seen that all of the alkali and a portion of the alumina may be continuously recirculated in the process, and that additional alkali as required to make up for any alkali loss in the process, such as by volatilization, washing, etc., is supplied from an inexpensive source.

The precipitated aluminum hydrate resulting from the Bayer process may be calcined or otherwise treated by any well known methods for obtaining alumina, if it is desired to convert the aluminum hydrate to alumina.

While the term "sodium oxide" or "sodium compound" has been used in describing the process herein, it is to be understood that other alkali metal compounds, such as potassium compounds, may be used, and, if present in the raw material, should be calculated, together with the sodium, as alkali metal oxide.

Furthermore, it is to be understood that the particular compounds disclosed and the procedure set forth are merely illustrative, and are presented for purposes of explanation and illustration, and that various equivalents of the compounds can be used and modifications of the procedure made without departing from the spirit of my invention, as defined in the appended claims.

What I claim is:

1. In the process of treating aluminous silicious material containing a substantial proportion of silica by the process steps of mixing the material with calcium compound, and sodium compound in such proportions that the charge will contain approximately the proportion of 1 molecule of silica to 2 molecules of calcium oxide and 1 molecule of alumina to from 1 to 1.7 molecules of sodium oxide, sintering the charge, dissolving out the sodium aluminate from the sintered charge and recovering alumina from the sodium aluminate solution and leaving a spent lye low in alumina, the improvement which comprises first sintering a relatively small portion of the aluminous silicious material with sodium chloride in the presence of steam to form silico-sodio-aluminate and mixing said silico-sodio-aluminate with sufficient aluminous silicious material, limestone, and said spent lye to form a charge of the above molecular proportions.

2. In the process of treating aluminous silicious material containing a substantial proportion of silica by the process step of mixing the material with a calcium compound and a sodium compound in such proportions that the charge will contain approximately the proportion of 1 molecule of silica to 2 molecules of calcium oxide and 1 molecule of alumina to from 1 to 1.7 molecules of sodium oxide, sintering the charge, dissolving out the sodium aluminate from the sintered charge and subjecting the sodium aluminate to a precipitation process to precipitate aluminum hydrate, the improvements which comprise first sintering a relatively small portion of the aluminous silicious material with sodium chloride in the presence of steam to form a silico-sodio-aluminate, and forming said charge in the molecular proportions above specified from the silico-sodio-aluminate thus formed, a calcium compound, a portion of the residue resulting from the precipitation of aluminum hydrate, and aluminous silicious material.

3. The process of treating aluminous silicious material containing a substantial proportion of silica, which comprises forming a standard furnace charge from said aluminous silicious material, sufficient silico-sodio-aluminate to replace losses of sodium in the process, a calcium compound, and spent lye from the Bayer precipitation process, sintering the charge, dissolving out the sodium aluminate from the sinter, subjecting the sodium aluminate to the Bayer precipitation process to precipitate a portion of the aluminum hydrate, utilizing a portion of the residual spent lye from said precipitation process for dissolving sodium aluminate from the sintered product, and utilizing the remainder of the residual spent lye for supplying a portion of the sodium aluminous content for a standard furnace charge.

4. In the process of treating aluminous material containing a substantial portion of silica by the process steps of forming a standard furnace charge from said aluminous material, a calcium compound, and a sodium compound, sintering the charge, dissolving out the sodium aluminate from the sinter, subjecting the sodium aluminate to a precipitation process to precipitate the aluminum hydrate therefrom and leave a residual spent lye, the improvements which comprise first sintering a portion of the aluminous material for forming the standard furnace charge with sodium chloride in the presence of steam to form silico-sodio-aluminate, and utilizing the silico-sodio-aluminate thus formed and a portion of the residual spent lye to supply the necessary sodium compound to form the standard charge.

5. The process according to claim 4, in which the charge to form the silico-sodio-aluminate consists of aluminous silicious material and sodium chloride in such molecular proportion that the sodium content in the charge, calculated as sodium oxide, will be present in the molecular ratio of from 1 to 2 molecules of sodium oxide to 1 molecule of aluminum oxide.

6. The process according to claim 4, in which the charge to form the silico-sodio-aluminate consists of aluminous silicious material and sodium chloride in such molecular proportion that the sodium content in the charge, calculated as sodium oxide, will be present in the molecular ratio of approximately 1½ molecules of sodium oxide to 1 molecule of aluminum oxide.

7. In the process of treating aluminous silicious material containing a substantial proportion of silica by the steps of mixing the material with a calcium compound and a sodium compound in proportions to form a standard furnace charge containing approximately the proportion of 1 molecule of silica to 2 molecules of calcium oxide and 1 molecule of alumina to from 1 to 1.7 molecules of sodium oxide, sintering the charge, dissolving out the sodium aluminate from the sintered charge, subjecting the sodium aluminate to a precipitation process to precipitate aluminum hydrate, and adding a portion of the residual spent lye resulting from such precipitation to form the furnace charge, the improvements which comprise first sintering a predetermined proportion of a small amount up to approximately 15% of the aluminous silicious material necessary to form the standard charge of the above molecular proportions, with sodium chloride in the presence of steam to form silico-sodio-aluminate and utilizing the silico-sodio-aluminate so formed to furnish sodium compound in the first mentioned furnace charge to compensate for losses of sodium compound in the process.

8. In the process of treating aluminous silicious material containing a substantial proportion of silica by the steps of mixing the material with a calcium compound and a sodium compound in proportions to form a standard furnace charge containing approximately the proportion of 1 molecule of silica to 2 molecules of calcium oxide and 1 molecule of aumina to from 1 to 1.7 molecules of sodium oxide, sintering the charge to form dicalcium silicate and sodium aluminate, dissolving out the sodium aluminate from the sintered charge, recovering aluminum hydrate and sodium compound from said aluminate and utilizing a portion of the sodium compound resulting from the process to form the said furnace charge, the improvements which comprise forming a preliminary furnace charge from a relatively small portion of the aluminous silicious material necessary to form a standard furnace charge, and sodium chloride in such molecular proportions that the sodium compound of the charge, calculated as sodium oxide, will be present in the molecular ratio of from 1 to 2 molecules of sodium oxide to 1 molecule of aluminum oxide, sintering said charge in the presence of steam to form silico-sodio-aluminate and hydrochloric acid, and mixing with the aluminous silicious material, a calcium compound and sodium compound recovered in the process of extracting aluminum hydrate, sufficient silico-sodio-aluminate to replace soda losses in carrying out the process, to form a charge of said predetermined proportions for sintering to obtain dicalcium silicate and sodium aluminate.

9. In the process of treating aluminous silicious material containing a substantial proportion of silica by the steps of mixing the material with a calcium compound and a sodium compound in such proportions that the charge will contain approximately the proportion of 1 molecule of silica to 2 molecules of calcium oxide and 1 molecule of alumina to from 1 to 1.7 molecules of sodium oxide, sintering the charge, extracting alumina and sodium compound from the sinter, the improvement which comprises utilizing a portion of the sodium compound extracted from the sinter, together with a sufficient portion of a sodium compound in the form of silico-sodio-aluminate to compensate for soda losses in the process to form a furnace charge of the above proportions.

10. In the process of treating aluminous silicious material containing a substantial proportion of silica by the process steps of mixing the material with an alkali earth metal compound and an alkali metal compound, sintering the charge, dissolving out the alkali metal aluminate from the sintered charge and recovering alumina and alkali metal compound from the alkali metal-aluminate solution, the improvement which comprises sintering a relatively small portion of the aluminous silicious material necessary to form the first mentioned furnace charge with alkali metal chloride in the presence of steam to form silico-alkali metal-aluminate and gaseous hydrochloric acid, and forming the charge for the first mentioned sintering, with alkali metal compound resulting from the above mentioned process, together with sufficient silico-alkali metal-aluminate to replace losses of alkali metal in carrying out the process.

ROY C. FOLGER.